UNITED STATES PATENT OFFICE.

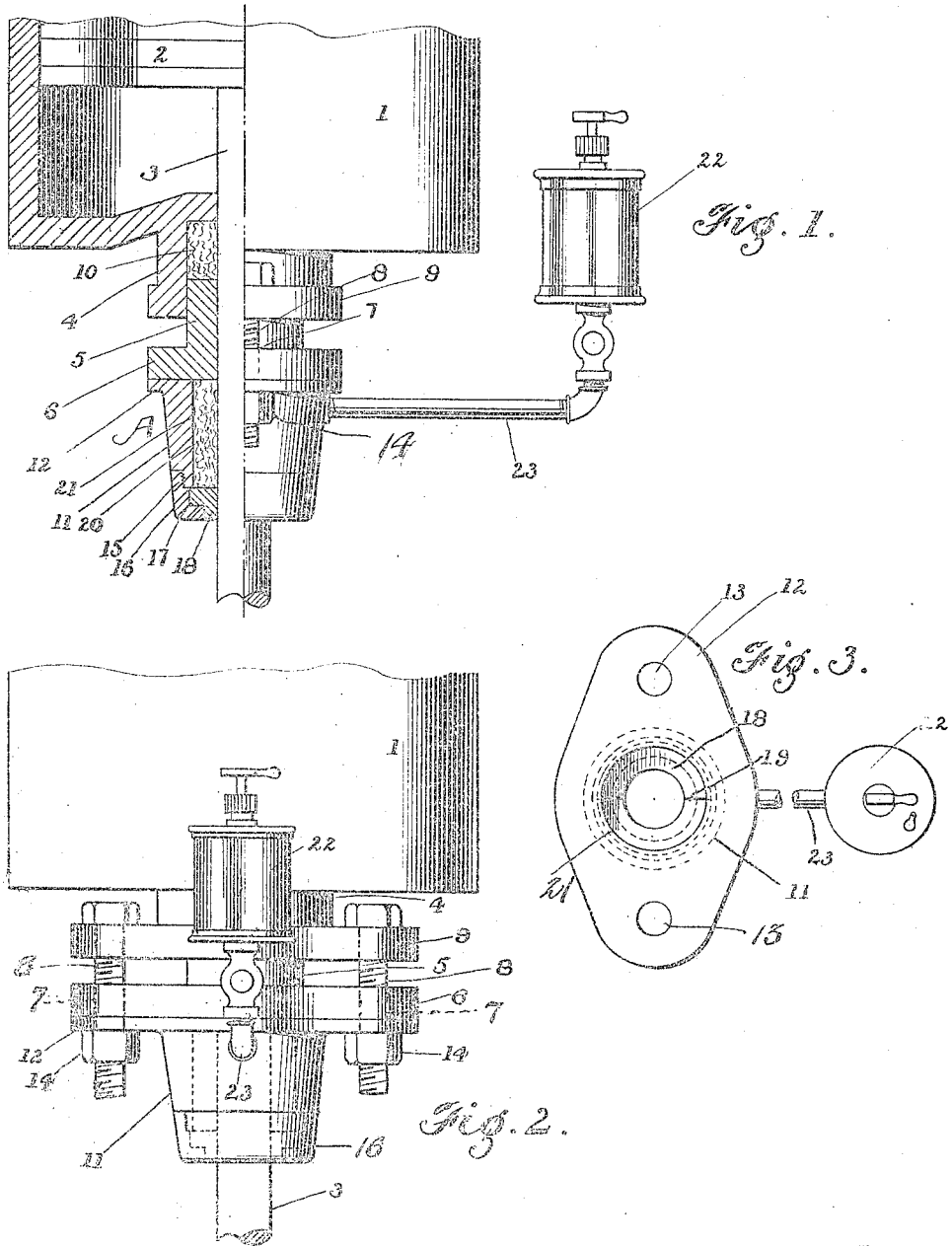

CHARLES W. FELTON, OF WASHINGTON, DISTRICT OF COLUMBIA, ASSIGNOR OF ONE-HALF TO WILLIAM B. HARRISON, OF WASHINGTON, DISTRICT OF COLUMBIA.

LUBRICATOR FOR PISTON AND PLUNGER RODS.

1,166,341.

Specification of Letters Patent. Patented Dec. 28, 1915.

Application filed September 24, 1915. Serial No. 52,432.

*To all whom it may concern:*

Be it known that I, CHARLES W. FELTON, a citizen of the United States, residing at Washington, in the District of Columbia, have invented new and useful Improvements in Lubricators for Piston and Plunger Rods, of which the following is a specification.

This invention relates to lubricators for piston and plunger rods, the same being particularly designed with reference to use in connection with the piston rod of a steam engine and the object in view being to produce a simple and practical device which may be manufactured at small cost, the said lubricator embodying a construction which enables the same to be repacked without the necessity of removing the body of the lubricator from the piston rod, the packing being insertible either from the top or bottom of the body of the lubricator.

A further object of the invention is to provide in connection with the lubricator body and a removable annular retainer, a split or sectional packing ring which is so combined with the body of the lubricator and the retainer and arranged in such relation to the space which contains the packing, that the packing is securely confined in place and maintained in perfect working relation to the piston rod while the sectional packing ring serves to remove excess oil from the piston rod while at the same time thoroughly spreading and distributing the oil throughout the entire surface of the rod.

With the above and other objects in view, the invention consists in the novel construction, combination and arrangement of parts, as herein described, illustrated and claimed.

In the accompanying drawings:—Figure 1 is a view partly in side elevation and partly in section of a steam engine cylinder and piston rod, showing the lubricator of this invention applied thereto. Fig. 2 is a view in elevation of the same taken at right angles to Fig. 1. Fig. 3 is a plan view of the lubricator detached.

Referring to the drawings 1 designates the cylinder of an engine, 2 the piston mounted to reciprocate therein, 3 the piston rod, 4 the stuffing box and 5 the stuffing box gland, the latter being provided with the usual elliptical flange 6 provided with the usual bolt holes 7 which receive the bolts 8 which also pass through other holes in a correspondingly shaped flange 9 of the box 4, whereby the gland may be drawn into the stuffing box 4 in order to compress the usual packing 10 therein around the piston rod to prevent leakage of the steam. All of the parts described up to this time are of the usual construction and arrangement.

In carrying out the present invention, I provide a lubricator designated generally at A and comprising the main hollow cylindrical body 11 which is provided at the upper edge thereof, under the arrangement shown in Figs. 1 and 2, with an elliptical flange 12 formed with holes 13 suitably placed to receive the bolts 8 above referred to whereby the lubricator body 11 is securely fastened to the gland 6 and moved simultaneously and equally therewith toward the stuffing box 4 when the nuts 14 on the bolts 8 are tightened to compress the stuffing box packing as hereinabove described.

The end of the body 11 opposite the flange 12 is reduced and externally threaded at 15 to receive a rabbeted and internally threaded annular retainer 16 which is thus detachably secured to the body 11 as clearly shown in Fig. 1. The retainer 16 is formed with an annular rabbet 17 to receive a correspondingly rabbeted packing ring 18 of Babbitt metal or other such soft metal which will wear down to fit any irregularities in the shape or alinement which may exist in the rod without scoring, binding or injuring the rod in any manner, said ring 18 being diametrically split or divided into semi-circular sections as shown at 19 whereby the sections of the ring 18 may be assembled around the rod 3 without disconnecting the latter in any way. The ring 18 has a diameter in excess of the internal diameter of the body 11 so that it is firmly clamped between the lower extremity of the body 11 and the shoulder provided by the formation of the annular rabbet 17. Wick packing 20 is inserted in the annular chamber 21 of the body 11 as shown and is confined between the body 11, the rod 3, the gland 5 and the Babbitt ring 18.

The packing 20 is filled with lubricating oil which is preferably furnished by a sight feed lubricating cup 22 of well known construction, from which an oil feed pipe 23 leads through the side wall of the body 11 preferably adjacent to the flange 12.

While the lubricator hereinabove described has been illustrated as used in connection with a vertical cylinder steam engine, it will, of course, be understood that the device is equally as useful in horizontal or inclined engines or any other kind of machinery driven by any power whatsoever where rods or shafting of any cross sectional shape whatsoever having longitudinal motion require lubrication. By means of the particular construction of the lubricator as hereinabove set forth, by merely removing the nuts 14, the lubricator may be moved lengthwise of the rod 3 so that new packing 20 may be inserted in the flanged end of the body 11. Another way of repacking the lubricator is to unscrew the annular retainer 16 simultaneously moving the Babbitt ring away from the body 11 so as to uncover the packing space. New packing may then be inserted in the opposite end of the body 11, after which the members 16 and 18 are slid back to their respective places and the annular retainer 16 screwed tightly in place. After the Babbitt ring 18 has become too far worn for further use, the sections of a new Babbitt ring may be assembled around the rod 3 and all of the parts brought into the same relation as herein described and shown. In the manufacture of my invention it is proposed to furnish a mold by which the mechanic having charge of the machinery may melt and pour Babbitt metal therein and mold new rings 18 at will.

I also contemplate applying my invention to any and all kinds of rods and shaftings, as well as parts of any engines or machinery having longitudinal motion imparted by any power whatsoever.

Having thus described my invention, I claim:—

The combination with a cylinder, a piston rod, a stuffing box having a bolt receiving flange, and a gland for said stuffing box having a corresponding bolt receiving flange, of a lubricator comprising a hollow cylindrical body the internal diameter of which is greater than the external diameter of said rod, a bolt receiving flange corresponding with the flanges of the gland and stuffing box to receive the same bolts, a rabbetted annular retainer having a threaded and detachable connection with said lubricator body, a sectional metallic packing ring seated in said retainer and adapted to be clamped thereby in fixed relation to one end of the lubricator body, wick packing contained in said lubricator body around the piston rod, and a regulated oil supply leading into said lubricator body by which the oil may be fed to the packing in proper amount without excess or waste of oil.

In testimony whereof I affix my signature in presence of two witnesses.

CHARLES W. FELTON.

Witnesses:
H. CLIFFORD BANGS,
E. B. SHAVER.